Patented Dec. 8, 1931

1,835,434

UNITED STATES PATENT OFFICE

WERNER SCHMIDT, OF FRANKFORT-ON-THE-MAIN/MAINKUR, GERMANY, ASSIGNOR TO WINTHROP CHEMICAL COMPANY, INC., OF NEW YORK, N. Y., A CORPORATION OF NEW YORK

ORTHO-HYDROXYBENZYL-AROYL-AMINE ARSONIC ACIDS AND PROCESS OF MAKING SAME

No Drawing. Application filed May 22, 1928, Serial No. 279,855, and in Germany May 31, 1927.

The present invention relates to new ortho-hydroxy-benzyl-aroylamine-arsonic acids and to a process of preparing the same.

I have found that ortho-hydroxy-benzyl-aroylamine-arsonic acids of the general formula:

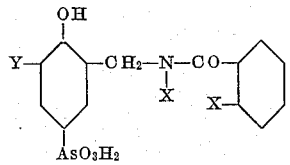

wherein the X's stand for hydrogen atoms which may be jointly replaced by a CO-group and Y stands for hydrogen, methyl or chlorine, are obtained by condensing para-hydroxy-phenyl-arsonic acids of the general formula:

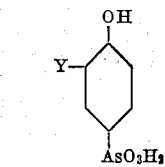

wherein Y has the aforesaid signification, in an acid solution with hydroxy-methyl-aroyl-amine compounds of the general formula:

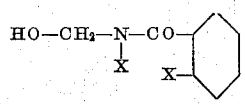

wherein X has the aforesaid signification.

The new compounds obtained by my process are identical with the products mentioned in my copending application Serial No. 279,854, filed May 22, 1928. By saponification they are transformed into the corresponding hydroxybenzylamine arsonic acids, which are the subject matter of my copending application, Serial No. 279,854. They possess a good therapeutical activity and are of an especial importance because they lack any neurotoxic action. They may also be used as starting materials for manufacturing other pharmaceutical products.

In order to further illustrate my invention the following examples are given, the parts being by weight and all temperatures in centigrade degrees; but I wish to be understood that my invention is not limited to the examples given nor to the exact conditions mentioned therein.

Example 1

22 parts of the sodium salt of the p-hydroxy-phenyl-arsonic acid are mixed with 15 parts of hydroxymethyl-benzoyl-amine and the mixture is introduced into 600 parts of sulfuric acid of 66° Bé. at 5–15°, while stirring and cooling with water. The solution thus obtained is allowed to stand for 12 hours, then it is poured on ice-water, partially neutralized by means of soda and precipitated with common salt. The 4-hydroxy-5-benzyl-benzoylamine-1-arsonic acid of the formula:

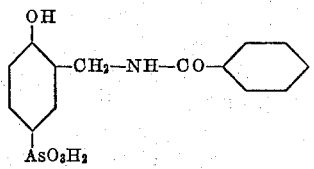

separates. It crystallizes from methyl alcohol in the form of white crystals melting at 220–221°. It is easily soluble in dilute alkalies and in a dilute soda solution, difficultly soluble in a dilute solution of sodium acetate, in water, spirit and acetone, insoluble in ether, benzene and in cold dilute mineral acids. It is identical with the product, described sub-paragraph (a) in Example 1 of my copending application Serial No. 279,854. As there explained in sub-paragraph (b) it may be saponified to the corresponding 4-hydroxy-5-benzylamine-1-arsonic acid.

Example 2

300 parts of the sodium salt of the 4-hydroxy-phenyl-arsonic acid and 180 parts of hydroxymethyl-phthalic imide are well mixed and introduced while cooling into 600 parts of sulfuric acid of 66° Bé., the temperature being maintained below 30°. After about 12 hours the condensation product is separated by pouring the reaction mass on ice-water. The precipitate is filtered off, washed with water and purified by dissolving it in an acetate solution and precipitating again with water. The new 4-hydroxy-5-benzyl-phthalic imide-1-arsonic acid corresponds to the formula:

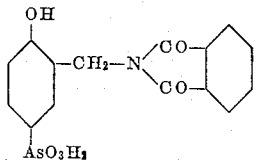

It crystallizes from a large quantity of hot water in the form of colorless needles melting at about 276°. It is soluble in hot water, in dilute alkalies and in warm acetate solutions, difficultly soluble in cold water and in dilute spirit, insoluble in mineral acids, in ether, benzene and benzine. It is identical with the product described sub-paragraph (b) in Example 2 of my copending application Serial No. 279,854. As there explained it may be saponified to the 4-hydroxy-5-benzylamine-1-arsonic acid.

*Example 3*

320 parts of the sodium salt of the 3-chloro-4-hydroxy-phenyl-arsonic acid and 180 parts of hydroxymethyl-phthalic imide are well mixed and introduced, while cooling and stirring, into 600 parts of sulfuric acid of 66° Bé. at a temperature of 20–25°. After 24 hours the mass is poured on ice-water. The white crystalline precipitate thus formed is filtered off, washed with water until it shows a neutral reaction and dissolved in the calculated amount of a cold soda solution. The solution is filtered and the new compound is precipitated by acidifying the solution.

The 3-chloro-4-hydroxy-5-benzyl-phthalic imide-1-arsonic acid corresponds to the formula:

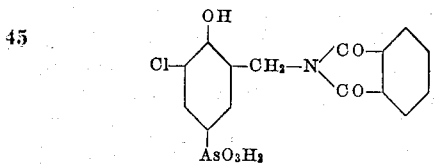

It crystallizes from boiling dilute spirit in the form of small needles of the melting point 263–264°. It is soluble in dilute alkalies, in a dilute soda and acetate solution, difficultly soluble in hot spirit, insoluble in ether, benzene, benzine and in dilute acids.

*Example 4*

If in the Example 3 the 3-chloro-4-hydroxy-phenyl arsonic acid is replaced by the corresponding amount of the 3-methyl-4-hydroxyphenyl arsonic acid and otherwise the process is carried out in the same manner, the new 3-methyl-4-hydroxy-5-benzylphthalic imide-1-arsonic acid corresponding to the formula:

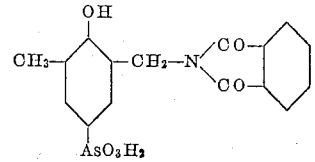

is obtained in the form of a white powder melting at about 273°. It is more easily soluble in water than the above mentioned 3-chloro-4-hydroxy-5-benzyl-phthalic imide-1-arsonic acid showing otherwise very similar properties.

I claim:

1. A process for manufacturing ortho-hydroxybenzyl-aroyl-amine arsonic acids which process comprises condensing para-hydroxyphenyl-arsonic acids of the general formula:

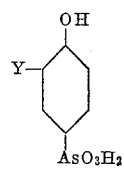

wherein Y stands for hydrogen, methyl or chlorine, in an acid solution with hydroxymethyl-aroyl-amine compounds of the general formula:

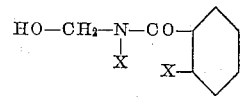

wherein the X's stand for hydrogen atoms which may be jointly replaced by a CO-group.

2. As new products ortho-hydroxy-benzyl-aroylamine arsonic acids of the general formula:

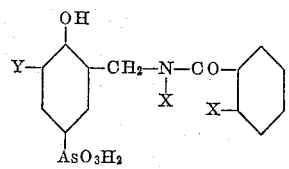

wherein the X's stand for hydrogen atoms which may be jointly replaced by a CO-group and Y stands for hydrogen, methyl or chlorine, which products are white crystalline substances, having a definite melting point, easily soluble in alkalies, difficultly soluble in water, spirit and acetone, insoluble in ether, benzene and in mineral acids.

3. As a new product the 4-hydroxy-5-benzyl phthalic imide 1-arsonic acid of the formula:

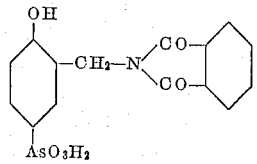

which product represents when crystallized from hot water colorless needles melting at about 276°, soluble in hot water, in dilute alkalies and in a warm alkali acetate solution, difficultly soluble in cold water and in dilute spirit, insoluble in mineral acids, in ether, benzene and benzine.

In testimony whereof, I affix my signature.

WERNER SCHMIDT.